Patented Jan. 26, 1943

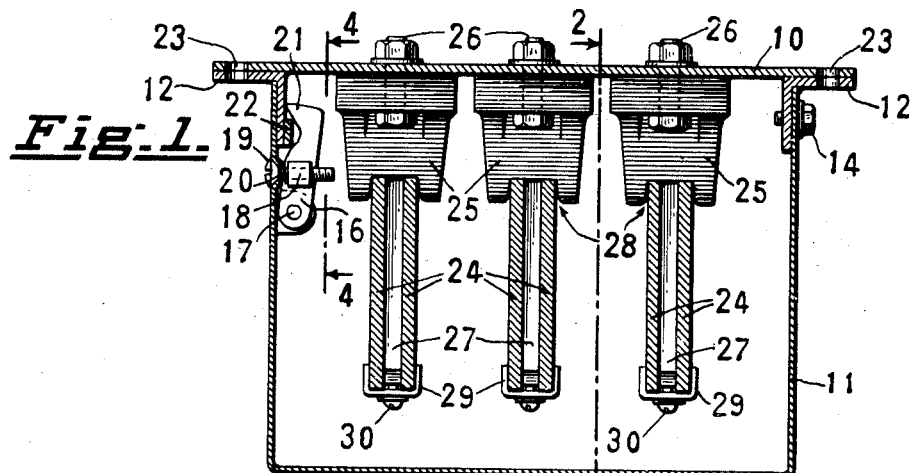
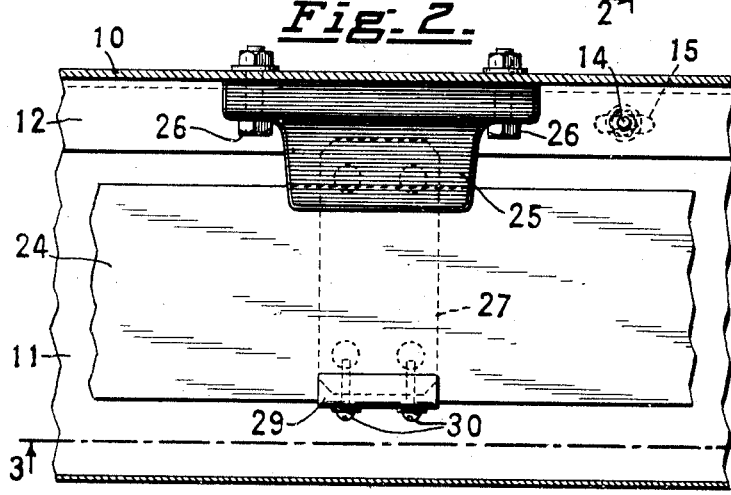
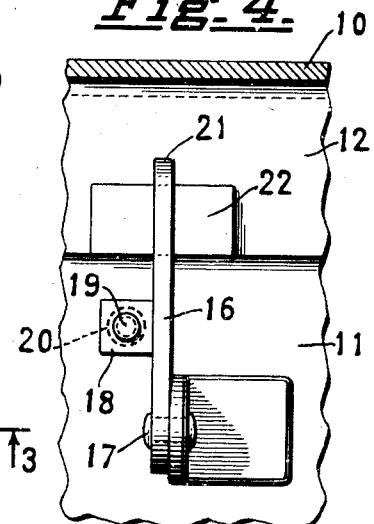
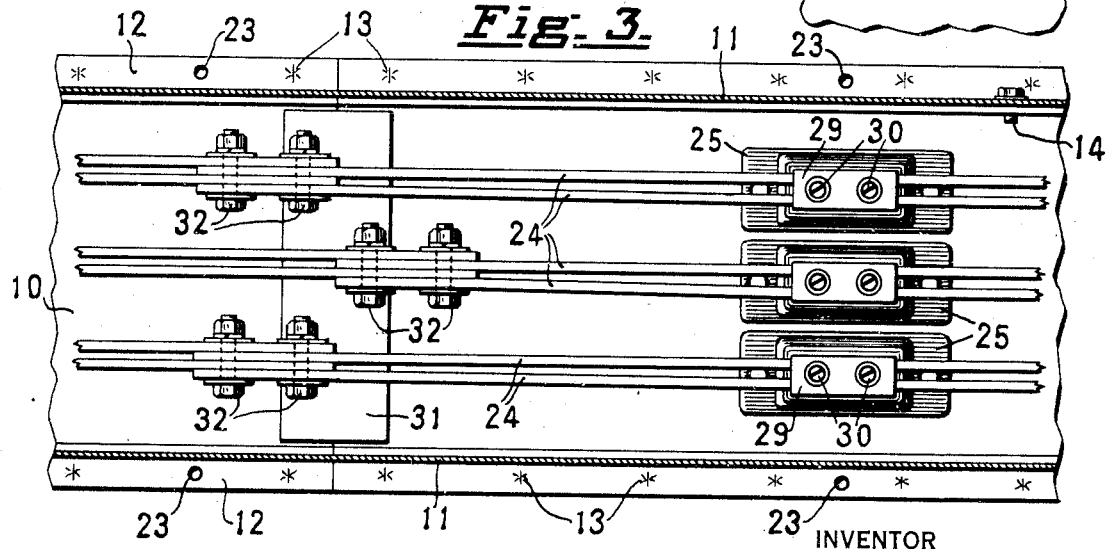

2,309,611

UNITED STATES PATENT OFFICE 2,309,611

BUS BAR CONDUIT

Frank Harvey, Cincinnati, Ohio, assignor to The Trumbull Electric Manufacturing Company, Plainville, Conn., a corporation of Connecticut Application March 3, 1936, Serial No. 66,783

8 Claims. (Cl. 174—101)

My invention relates in general to electrical distribution systems employing bus bars as conductors, the bus bars being enclosed in a housing or conduit. More particularly my invention relates to an arrangement of insulating supports for the bus bars and a housing therefor.

One object is to provide a simple and dependable type of construction.

A special object is to provide an enclosing and supporting structure which can be easily manipulated and which furnishes a complete enclosure for the bars when the system is in use.

Another object is to provide for an unobstructed accessibility to the bus bars and supports therefor when the housing or conduit cover is removed.

Still another object is to provide for comparatively low cost of manufacture and ease of assembly of bus bar systems and housings therefor.

In the drawing I have shown one form of my invention which includes a plurality of bus bar supports which are secured to a substantially flat base plate, and a removable bus bar housing or conduit which is deep enough to surround the bus bars and supporting structure thus permitting an unobstructed access to the bus bars and supports when the housing is removed.

Fig. 1 is a vertical section of a bus bar system embodying my invention.

Fig. 2 is a section on the line 2—2 of Fig. 1.

Fig. 3 is a horizontal section in the direction of the line 3—3 of Fig. 2 showing the joining of two sections.

Fig. 4 is an enlarged elevational detail of a form of catch shown in Fig. 1.

The housing or conduit for the bus bars is preferably constructed with a substantially flat base plate 10 and a relatively deep channel-like casing member 11. These two parts are secured together detachably and preferably through the medium of angle irons 12 which are secured to the plate 10 in any suitable manner, for instance, by welding spots 13. The channel casing is removably secured to these angle irons, for instance by bolts 14 which threadedly engage holes in the angle irons 12 and pass through slots 15 in the casing 11.

Another form of detachable securing means includes a clamp arm 16 pivotally secured as at 17 to the casing 11. This clamp arm has a screw threaded collar 18 which receives a screw 19. Surrounding the screw 19 between the casing and the screw threaded collar is a spring 20 which normally urges the clamp arm away from the casing. When the screw is tightened, the end 21 of the clamp 16 engages a lug 22 which is secured to the angle iron.

The housing as a whole may be supported from a ceiling, wall or other structure by means of screws, bolts or brackets which extend through holes 23, formed through the plate 10 and the angle irons 12. These holes may be located at any suitable spacing along the length of the conduit.

The system may employ any number of bus bars. In the form shown there are three pairs. The bus bars 24 are supported at intervals by special insulating blocks 25 which are secured to the plate 10 by means of screws or bolts 26. To each insulating block is secured a flat post member 27, preferably of metal or other conducting material. One edge of each bus bar is positioned in a groove 28 in an insulating block. The other edges of the bus bars are preferably secured in place by means of cap members 29 which may be fastened to the outer end of the posts 27 by means of screws 30.

By removing these caps 29 the bus bars may be readily mounted on or detached from the supports. The bus bars and the major portion of their supports are located outside of the confines of the angle irons 12 when the casing 11 is removed, thus providing unobstructed access to the bus bars and to the bus bar connecting bolts 32.

When joining adjacent sections of the system, splice plates 31 may be used, secured to the ends of adjoining base plates 10. Bolts 32 are used for joining together the ends of adjacent bus bar lengths.

This invention provides a simple means for supporting bus bars and conduits or the like. The insulating supports with the attached posts may be spaced apart at any distance which the system requires. The design of the housing permits easy removal of the channel casing member and, because of the shallow dimensions of the combined plate and angle irons, allows practically unobstructed access to the interior conducting parts after removal of the channel.

When supporting holes for the system are needed at any special points, it is only necessary to drill or punch them at the required points anywhere on the flanges along the length of the conduit, through the plate 10 and angle iron 12.

From the foregoing it readily will be seen that, in this construction I have provided a means whereby the channel member of the casing may be easily removed from the base plate to permit ready access to the enclosed parts. The bus bars may be easily installed or removed from the installation directly from the front of the conduit and the connecting bolts 32 for the bus bars are substantially as readily accessible as they would be if the insulating supports on which they are mounted were mounted on a flat surface or support.

This application is a continuation in part of my earlier application Serial Number 57,107, filed January 2, 1936.

I claim:

1. In a power distribution system including bus bars, a metallic protective housing having a substantially flat supporting plate provided with means for supporting the bus bars, angle irons, each of said angle irons having an outwardly facing flange secured to the plate and another flange extending parallel with and substantially at right angles thereto, a channel-like cover of materially greater depth than the latter flanges, and means for detachably securing the edges of the cover to said flanges whereby the bus bars are enclosed when the cover is in place and the bus bars and the bus bar engaging portions of said bus bar supporting means are exposed and accessible from the sides and tops of said bus bars when the cover is removed, said plate and said first named flanges having holes therethrough for securing the entire structure to a suitable support.

2. In a power distribution system including bus bars, a metallic protective housing having a substantially flat top plate adapted to be secured to a suitable support and provided with means for supporting the bus bars, angle irons having flanges secured to the opposite outer edges of the top plate and having other flanges extending parallel with and substantially at right angles thereto and a channel-like cover of materially greater depth than the latter flanges, and means for detachably securing the edges of the cover to said other flanges whereby the bus bars are enclosed when the cover is in place and the bus bars and the bus bar engaging portions of said bus bar supporting means are exposed and accessible from the sides and tops of said bus bars when the cover is removed.

3. In a power distribution system, a substantially flat metallic supporting plate, a bus bar supported by but insulated and projecting from said plate and spaced therefrom, flanges on the edges of said plate and projecting therefrom at right angles from said plate a distance materially less than the spacing of the bus bar from said plate so that the bus bar is laterally exposed above and beyond said flanges, a channel-like metallic cover for said bus bar, said cover having its edges overlapping the outside of said flanges, and means for detachably securing the edges of said cover to said flanges.

4. In a power distribution system, a substantially flat top plate, bus bars supported by but insulated from said top plate and projecting therefrom, flanges secured to each of the opposite edges of said plate and projecting therefrom at right angles to said plate a distance materially less than the spacing of the bus bars above said flanges so that the bus bars and a substantial portion of the supporting means for said bus bars may be exposed above and beyond said flanges and a channel-like metallic cover having its edges overlapping said projecting flanges and means for detachably securing the edges of said cover to said flanges.

5. In a power distribution system, a substantially flat plate, insulating supporting blocks secured to said plate, bus bars carried by said blocks, means for detachably securing said bus bars to said blocks, flanges on each of the opposite edges of said plate projecting therefrom parallel therewith and at right angles thereto a distance materially less than the projection of the bus bar carrying blocks so that the bus bars and detachable securing means for said bars and a substantial portion of said insulating supporting blocks may be exposed above and beyond said flanges, a channel-like cover for said bus bars and blocks, said cover having its edges overlapping said flanges, and means for detachably securing the edges of said cover to said flanges.

6. In a power distribution system including bus bars, a substantially flat sheet metal supporting plate, insulating supports for said bus bars mounted on said supporting plate, bus bars detachably mounted on said insulating supports, a sheet metal cover of channel-like form for said bus bars, the channel-like portion of said cover being of sufficient depth and width to properly electrically clear all of the conducting parts of the system when in position on the plate and means for detachably securing said cover member to said flat supporting plate said bus bars being fully exposed laterally when said cover is removed.

7. In a power distribution system including bus bars, a substantially flat sheet metal supporting plate having flanges on opposite edges thereof, bus bars supported by but insulated and projecting from said plate and spaced therefrom beyond said flanges, a cover for positioning on said supporting plate having bottom and side walls, said cover adapted to engage said flanges and to be removably carried by said supporting plate and being of sufficient depth and width to properly electrically clear all the conducting parts of the system when said cover is in engagement with said flanges, said bus bars being fully exposed laterally when said cover is removed.

8. In a power distribution system including bus bars, a substantially flat sheet metal supporting plate, bus bars supported by but insulated and projecting from said plate and spaced therefrom so that the bus bars are exposed laterally, a cover for positioning on said plate, said cover having bottom and side walls and being of sufficient depth and width to properly electrically clear all the conducting parts of the system when in position on said supporting plate, said bus bars being fully exposed laterally when said cover is removed, the said cover adapted to be removably carried by said supporting plate when in position thereon.

FRANK HARVEY.